United States Patent [19]

Yamaguchi et al.

[11] Patent Number: 5,064,563
[45] Date of Patent: Nov. 12, 1991

[54] PROCESS FOR PRODUCING AND USE OF MALEIC ACID (CO-) POLYMER SALT IMPROVED IN BIODEGRADABILITY

[75] Inventors: Shigeru Yamaguchi; Tokihiro Yokoi; Shorbu Shioji; Yoshio Irie, all of Himeji; Teruaki Fujiwara, Nagaokakyo, all of Japan

[73] Assignee: Nippon Shokubai Co., Ltd., Osaka, Japan

[21] Appl. No.: 515,997

[22] Filed: Apr. 27, 1990

[30] Foreign Application Priority Data

Apr. 28, 1989 [JP]  Japan ................... 1-107200

[51] Int. Cl.$^5$ .......................... C11D 7/40; C08F 4/42; C08F 2/10; C02F 5/08
[52] U.S. Cl. ................................ 252/174.23; 252/80; 252/180; 252/175; 526/240; 526/81; 526/91; 210/701; 524/804; 562/595
[58] Field of Search ........................... 526/240, 81, 91; 210/701; 524/804; 252/180, 80, 175, 174.23; 562/595; 260/78.5

[56] References Cited

U.S. PATENT DOCUMENTS

| 3,635,915 | 1/1972 | Gale | 260/78.5 |
|---|---|---|---|
| 4,314,044 | 2/1982 | Hughes et al. | 526/91 |
| 4,519,920 | 5/1985 | Fukomoto et al. | 210/701 |
| 4,555,557 | 11/1985 | Fukumoto | 526/240 |
| 4,589,995 | 4/1986 | Fukumoto | 252/180 |
| 4,659,793 | 4/1987 | Yang | 526/91 |
| 4,668,735 | 5/1987 | Fukumoto et al. | 524/804 |
| 4,709,091 | 11/1987 | Fukumoto et al. | 562/595 |
| 4,739,008 | 4/1988 | Robinson | 526/81 |

FOREIGN PATENT DOCUMENTS

| 0337694 | 10/1989 | European Pat. Off. |
|---|---|---|
| 57-168906 | 10/1982 | Japan . |
| 59-64615 | 4/1984 | Japan . |
| 59-176312 | 10/1984 | Japan . |
| 59-210913 | 11/1984 | Japan . |
| 59-213714 | 12/1984 | Japan . |
| 60-212410 | 10/1985 | Japan . |
| 60-212411 | 10/1985 | Japan . |
| 60-212412 | 10/1985 | Japan . |
| 61-178097 | 8/1986 | Japan . |
| 62-91295 | 4/1987 | Japan . |
| 62-91296 | 4/1987 | Japan . |
| 62-218407 | 9/1987 | Japan . |
| 63-114986 | 5/1988 | Japan . |
| 63-235313 | 9/1988 | Japan . |
| 63-236600 | 10/1988 | Japan . |
| 2181735 | 3/1987 | United Kingdom . |

OTHER PUBLICATIONS

*Organic Builders*, Yukagaku, vol. 35, No. 11, pp. 937–944 (1986).

*Primary Examiner*—Paul Lieberman
*Assistant Examiner*—Kevin D. McCarthy
*Attorney, Agent, or Firm*—Armstrong, Nikaido, Marmelstein, Kubovcik & Murray

[57] ABSTRACT

A specially defined amount of hydrogen peroxide is used as a polymerization catalyzer; a specially defined amount and a specially defined kind of a polyvalent metal ion is used; and a specially defined amount of an alkaline substance is used, in order to polymerize a monomer component consisting essentially of only maleic acid, or a monomer component composed of maleic acid and another water-soluble ethylenically unsaturated monomer, in a specially defined proportion in water, whereby a maleic acid polymer salt, preferably a copolymer salt, of improved biodegradability is produced. The maleic acid polymer salt obtained is superior in biodegradability, has a low residual monomer content, and is useful as a detergent builder and as a scale inhibitor, etc.

21 Claims, No Drawings

PROCESS FOR PRODUCING AND USE OF MALEIC ACID (CO-) POLYMER SALT IMPROVED IN BIODEGRADABILITY

BACKGROUND OF THE INVENTION

The present invention relates to a process for producing and use of maleic acid (co-)polymer salt improved in biodegradability. In detail, it relates to a process for producing a maleic acid (co-)polymer salt improved in biodegradability, which is very useful as a detergent building, a scale inhibitor, and various kinds of chelating agents etc., by using a specially defined polymerization catalyzer and a specially defined polymerization method, with high efficiency and cheap cost, and also, relates to the use as a detergent building and a scale inhibitor etc.

As a detergent building, a scale inhibitor, and a chelating agent etc., an additive based on phosphorus, such as a condensed phosphoric acid salt and a phosphoric acid salt, has so far been used. However, when run into the sea or lake through a river etc., these become an original substance for a red tide etc., so that their use is very limited. Thus, instead of a phosphorus additive, an additive in a series of polycarboxylic acid salts has practically been used in recent years in the forementioned field and in large quantity. However, the polycarboxylic acid salts additive which have so far been used are all poor in the biodegradability and, for example, in a case where it is used in large quantity as a detergent building or a scale inhibitor etc., there may take place such a greatly serious problem as the accumulation in circumstances.

For example, although there is proposed a maleic acid (co-)polymer (salt), which is obtained with polymerization in a mixed solvent of water and a primary alcohol or carbon number 1 4 or a ketone of carbon number 3 4 in Japanese Official Patent Provisional Publication, showa 62-91295, and Japanese Official Patent Provisional Publication, showa 62-91296, the maleic acid (co-)polymer (salt) thus published was low in the biodegradability and insufficient in properties useful as a scale inhibitor. Besides, in these arts, a maleic acid (co-)polymer (salt) of high polymerization percentage was not obtained. Also, although there are proposed maleic acid (co-)polymer salts obtained by a polymerization in water solvent in the presence of hydrogen peroxide, which were described in Japanese Official Patent Provisional Publications, showa 57-168906 (U.S. Pat. No. 4,519,920), showa 59-64615 (U.S. Pat. No. 4,668,735), showa 59-176312 (U.S. Pat. No. 4,589,995), showa 59-210913, showa 59-21374, showa 60-212410, showa 60-212411 (U.S. Pat. No. 4,709,091), showa 60-212412, showa 612-178097, showa 62-218407 (U.S. Pat. No. 4,659,793), showa 63-114986, showa 63-235313, and showa 63-236600, the maleic acid (co-)polymer salts thus published show very inferior biodegradability. There is no description about the biodegradability in all said literatures.

On the other hand, although there is described in "YUKAGAKU, 35, 937 (1986)" that sodium poly-$\beta$-DL-malic acid, which is formed with ring-opening polymerization of malolactons, shows high biodegradation percentage, properties of this polymer as a detergent building are unsufficient, and the synthesis of this polymer requires a complex process, so that the industrial utility is low. Also, there is described that a polymer of $\alpha$-hydroxyacrylic acid shows biodegradability, but this polymer decomposes only with specially defined bacteria, and the synthesis and this polymer requires a complex process and, as a result, it becomes very expensive, so that the industrial utility is low.

Therefore, there has been greatly desired a process with which a polycarboxylioc acid salt which has useful biodegradability as a detergent builder, a scale inhibitor, and various kinds of chelating agents etc. is produced with cheap cost and in a high yield.

SUMMARY OF THE INVENTION

As a result of extensive studies, the present inventors improved the low biodegradability of a hitherto known polycarboxylic acid salt. Furthermore, they greatly raised the industrial utility by improving the insufficient properties of a hitherto known polycarboxylic acid salt as a detergent builder and a scale inhibitor.

That is, the first aspect of the present invention relates to a process for producing a maleic acid (co-)polymer salt improved process for producing a maleic acid (co-)polymer salt improved in biodegradability which, in a case where a monomer component composed of 75 100 weight % of maleic acid (A) and 25 0 weight % of another water-soluble ethylenically unsaturated monomer (B) (here, the total amount of (A) and (B) is 100 weight %) is polymerized in an aqueous solution, catalyzed by in 12~150 g of hydrogen peroxide (against 1 mole of the monomer component) and the polymerization is carried out under a condition such that there exist 0.3 500 ppm (against weight of the monomer component) of at least a kind of polyvalent metal ion selected from a vanadium ion, an iron ion, and a copper ion as well as an alkaline substance which is required to neutralize up to 45 mole % of the whole acid group in the monomer component.

The second and the third aspects of the present invention, respectively, relates to the use of the products of the first aspect of this invention as a detergent builder and a scale inhibitor, both of which are characterized by being composed of a maleic acid (co-)polymer salt improved in biodegradabilty that is obtained from said first aspect of the present invention.

In this invention, it is necessary to surely use water as a polymerization media. When a hydrophobic solvent alone, such as an aromatic hydrocarbon, a hydrophilic solvent alone, such as alcohol and ketone, and a mixture of solvents, such as a mixture of water with these hydrophilic solvents, are used as a solvent in polymerization, the biodegradability of the product becomes very lower due to differences between a terminal end group or a main chain structure of the generated polymer and that of the maleic acid (co-)polymer salt of the present invention. That is, the biodegradability lowers by reason of either the terminal end of the polymer was an alcoholic or ketonic residue or because decarboxylation does not occur.

In the present invention, when the monomer component containing maleic acid is polymerized in an aqueous solution, it is essential that the polymerization is carried out under a condition of that there exist at least one polyvalent metal ion selected from a vanadium, an iron ion, and a copper ion in an amount in the range of 0.3 500 ppm, against the monomer component (standard weight of an acid form). Preferably, it is a range of 0.5 300 ppm and, more preferably, a range of 1 50 ppm. If the amount used is less than 0.3 ppm, the residual monomer increases unpreferably. If the amount used exceeds 500 ppm, the biodegradability lowers. Furthermore, the product purity decreases unpreferably. Also, in the case where an ion besides the vanadium ion, iron ion, and a copper ion is used, the amount of the residual monomer increases as in the case where metal ion is not used at all, and the biodegradability becomes low.

As a vanadium ion, an iron ion, and a copper ion being used in this invention, for example, there are cited $V^{z+}$, $V^{3+}$, $VO^{2+}$, $VO_3{}^{2-}Fe^{z+}$, $Cu^{z+}$, and so on, but among those, are preferred $VO^{z+}$, $Fe^{3+}$, $Cu^{2+}$. In the case where increase in polymerization yield is desired, the $VO^{z+}$ ion is most preferred. The polyvalent metal ion is not especially limited in the form being supplied into a polymerization system, and if it is capable of ionizing in a polymerization system, it can be fed as a polyvalent metal compound or as a simple substance.

As a polyvalent metal compound or a simple substance like the above, for example, are cited water-soluble polyvalent metal salts such as vanadium oxytrichloride, vanadium trichloride, vanadyl oxalate, vanadyl sulfate, anhydrous vanadic acid, ammonium methavanadic acid, ammonium hypovanadous sulfate (($NH_4$) $_zSO_4$ . $VSO_4$ .6 $H_2O$), ammonium vanadous sulfate (($NH_4$) $VSO_4$.12 $H_2O$), cupric acetate, cupric bromide, cupric acetyl acetate, ammonium cupric chloride, cupric carbonate, cupric chloride, cupric citrate, cupric formate, cupric hydroxylic acid, cupric nitrate, cupric naphthenic acid, cupric oleinic acid, cupric maleate acid, cupric phosphate, cupric sulfate, iron acetyl acetonate, ammonium iron citrate, ammonium ferric oxalate, ammonium ferrous sulfate, iron citrate, iron fumarate, iron maleate, ferrous lactate, ferric nitrate, iron pentacarbonyl, ferric phosphate, ferric pyrophosphate and so on; polyvalent metal oxides such as vanadium pentoxide, cupric oxide, ferrous oxide, ferric oxided, and so on; polyvalent metal sulfides such as cupric sulfide, ferric sulfide, ferrous sulfide, and so on; others such as copper powder, iron powder, and so on.

Furthermore, in order to adjust the ion concentration of the polyvalent metal ions, it is possible to use, in combination with the forementioned polyvalent metal ion, for example, a chelate-forming agent based on condensed phosphoric acids such as pyrophosphoric acid, hexamethaphosphoric acid, and tripolyphosphoric acid etc.; aminocarboxylic acids such as ethylenediaminetetraacetic acid, nitrilotriacetic acid, and diethylenetriaminepentaacetic acid etc.; phosphonic acids such as 1-hydroxyethylydene-1,1-diphosphonic acid and 2-phosphonobutane-1,2,4-tricarboxylic acid etc.; organic acids such as fumaric acid, malic acid, citric acid, itaconic acid, oxalic acid, and crotonic acid, etc.; and polycarboxylic acids such as polyacrylic acid etc. The polymerization temperature preferred is in a range of 85 180° C., because it fits with a purpose of short polymerization time and increase of biodegradability. The more preferable temperature is in a range of 100 150° C. If the temperature is less than 85° C., the polymerization process may be disturbed. During polymerization, a solid portion is performabe in a wide range, but the 30~99 weight %, more preferably the range of 40~95 weight % is recommended because of capability to reduce the amount of the residual monomer.

In the present invention, these should be used 12~150 g (against 1 mole of a monomer component) of a polymerization initiator. Preferably 15~100 g (against 1 mole of a monomer component) and more preferably 20~70 g (against 1 mole of a monomer component) are used. In the case of an amount less than 12 g (against 1 mole of a monomer component), a maleic acid (co-)polymer salt which is superior in biodegradability can not be obtained. In the case of an amount exceeding 150 g (against 1 mole of a monomer component), although the biodegradability does not decrease, hydrogen peroxide is apt to remain in the obtained maleic acid (co-)polymer salt and the cost for production increases, so that an amount of 150 g or less is preferably used. Also, if the hydrogen peroxide is replaced with another water-soluble initiator, for example with a persulfate salt, such as ammonium persulfate, sodium persulfate, and potassium persulfate, etc.; a hydrophilic organic peroxide such as tertiary-butyl hydroperoxide, etc.; a water-soluble azo compound such as 2,2'-azobis (2-aminozinopropane) hydrochloric acid salt, etc., a maleic acid (co-)polymer salt, which has superior biodegradability as that produced by this invention, can not be obtained. A method to supply the hydrogen peroxide into water is not especially limited and, for example, it is carried out by one time addition into the reaction system at an initial stage, continuous addition into the reaction system, or in a case, dividing followed by adding into the system.

In the present invention, the polymerization is required to be carried out under a condition that an alkaline substance, necessary for neutralizing up to 45 mole % of the whole acid group of the monomer component exists. A preferable range can be set as 5 to 40 mole %. A maleic acid (co-)polymer salt, which is obtained under a condition such that an alkaline substance exceeding 45 mole % exists, shows inferior biodegradability.

As described above, if the existing amount of the alkaline substance exceeds 45 mole % compared to the whole acid group, or if an especially defined amount of an especially defined polyvalent metal ion or an amount of 12 g or more of hydrogen peroxide is not used, the obtained maleic acid (co-)polymer salts show very inferior biodegradability.

Although there is no special limitation on the alkaline substance which can be used, there are cited the hydroxides or carbonates of alkali metals such a sodium, potassium, and lithium etc.; ammonia; the alkylamines, such as monomethylamine, dimethylamine, trimethylamine, monoethylamine, diethylamine, and triethylamined etc.; the alkanolamines such as monoethanolamine, diethanolamine, triethanolamine, isopropanolamine, and dimethyethanolamine, etc.; pyridine and so on. Among those, the hydroxides and carbonates of alkali metals, since they are of cheap cost and most easily available from an industrial viewpoint, are especially preferred.

Also, the maleic acid (co-)polymer salt in this invention is required to be derived from a monomer component which contains 75 weight % or more of maleic acid (in the case where the water-soluble ethylenically unsaturated monomer B) is a monomer in the salt form, it is necessary that the amount used is 25% or less on a standard of the acid form). More preferably the amount can be 80 weight % or more. A maleic acid (co-)polymer salt, which results from polymerization of a monomer component that contains 75 weight % of maleic acid, shows very inferior biodegradability.

It should be remembered that the present invention is not to be confused with the conventional art of component conditions similar to the present invention. For example, the maleic acid (co-)polymer salt, which is published in said Japanese Official Patent Provisional Publication, showa 62-218407 (U.S. Pat. No. 4,659,793), show very inferior biodegradability because of any one of the undermentioned reasons, that is, because the amount of maleic acid used is less than that used in the case of the maleic acid (co-) polymer salt of the present invention, or because 12 g (against 1 mole of a monomer component) or more of hydrogen peroxide has not been used in an example of the publication, furthermore because the neutralization extent against the whole acid group is 50% or more. Besides, there is no description about the biodegradation in the literature. The present invention overcomes a significant lack of biodegradability of the maleic acid copolymer salt, which is published in said Japanese Official Patent Provisional Publication, showa 62-218407 (U.S. Pat. No. 4,659,793), as well as insufficiency in properties which a detergent builder and a scale inhibitor etc. should have.

It should be understood that maleic anhydride can of course replace maleic acid (A), because the maleic anhydride easily reacts with water converting it into maleic acid.

As long as the water-soluble ethylenically unsaturated monomer (B) of this invention is water-soluble and is a monomer capable of copolymerization with maleic acid, the monomer (B) can be used without any limitation. The polymer salts thus-derived from polymerization of maleic acid alone and from copolymerization with maleic acid show very high biodegradability compared with that of the conventional maleic acid (co-)polymer salt.

As the water-soluble ethylenically unsaturated monomer (B), for example, are cited monomers such as unsaturated monocarboxylic acids, such as acrylic acid, methacrylic acid, α-hydroxyacrylic acid, and crotonic acid etc.; unsaturated polycarboxylic acids such as fumaric acid, itaconic acid, citraconic acid, and aconite acid:

a monomers which are shown by the general formula (1) in the series of unsaturated alcohols

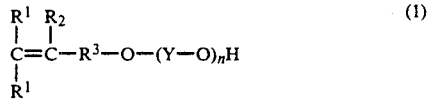

(in the formula, $R^1$ and $R^2$ independently represent a hydrogen atom of a methyl group but are not both methyl group, $R^3$ represents a $CH_2$—, —$(CH_2)_2$—, or —$C(CH_3)_2$— group and the total number of the carbon atoms in the $R^1$, $R^2$, and $R^3$ groups is 3, Y represents an alkylene group of carbon number 2 to 3, and n is 0 or a integral number of 1 to 100) such as allyl alcohol and polyethyleneglycol monoallyl ether: a monomer which is shown by the general formula (2) in a series of unsaturated allyl ethers

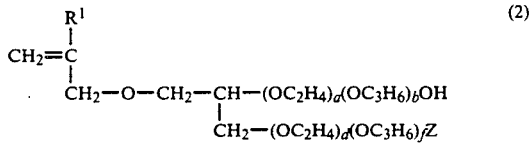

(in the formula, $R^1$ represents a hydrogen atom or a methyl group, a, b, d, and f independently represent 0 or a positive integral number and the total number of a, b, d, and f is 0 to 10, the —$(OC_2H^4)$— and —$(OC_3H_6)$- units may be combined in any order, Z represents a hydroxyl, sulfonic acid, or phosphoric (or phosphorous) acid group when the sum of d and f is 0, and Z represents a hydroxyl group when the sum is a positive integral number of 1 to 100): a monomer containing an unsaturated sulfonic acid group such as vinylsulfonic acid, allylsulfonic acid, methallylsulfonic acid, styrenesulfonic acid, 2-acrylamido-2-methylpropanesulfonic acid, sulfoethylmaleimide, sulfopropyl (meth) acrylate, 2-hydroxysulfopropyl (meth) acrylate etc.: a monomer in a series of water-soluble mono- or diesters between an alcohol, which is formed by the addition of 0 to 100 moles of ethylene oxide and/or propylene oxide to an alkylalcohol of carbon number 1 to 50, and (meth) acrylic acid, crotonic acid, maleic acid, fumaric acid, itaconic acid, citraconic acid, or aconitic acid etc.: a monomer in a series of mono- or di esters containing a water-soluble hydroxyl group which are formed by the addition of 1 to 100 mole of ethylene oxide and/or propylene oxide to a monomer in a series of unsaturated carboxylic acids such as acrylic acid, methacrylic acid, crontonic acid, maleic acid, fumaric acid, itaconic acid, citranconic acid and aconitic acid etc.: a monomer in a series of unsaturated amides such as N-methylol (meth) acrylamids, (meth) acrylamide, tertiary-butyl (meth) acrylamide etc.: a monomer in a series of unsaturated phosphorus-containing compounds such as (meth) acrylamidomethanephosphonic acid, (meth) acrylamidomethanephosphoic acid methyl ester, and 2-(meth) acrylamido-2-methylpropanephosphonic acid etc.: and a monomer in a series of unsaturated aminoalkyl compounds such as dimethylaminoethyl (meth) acrylate and dimethylaminopropyl (meth) acrylamide etc., and one or two or more kinds of monomers selected from these groups can be used.

In the case where a maleic acid (co-)polymer salt, obtained from a process for producing such, according to the present invention, is used as a detergent builder and a scale inhibitor, although there is no special limitation, the undermentioned unsaturated monomer is preferred as a water-soluble ethylenically unsaturated monomer (B). That is, these are preferred acrylic acid, methacrylic acid, a monomer in a series of unsaturated alcohols which is represented by the general formula (1),

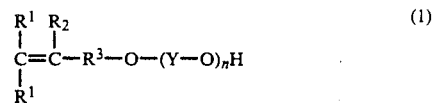

(but in the formula, $R^1$ and $R^2$ independently represent a hydrogen atom or a methyl group but both cannot be methyl groups at the same time, $R^3$ represents a —$CH_2$—, —$(CH_2)_2$—, or —$C(CH_3)_2$— group, the total of carbon number in the $R^1$, $R^2$ and $R^3$ groups is 3, Y represents an alkylene group of carbon number 2 to 3, and n is 0 or a integral number of 1 to 100), for example, 3-methyl-3-buten-1-ol (isoprenol), 3-methyl-2-buten-1-ol (prenol), 2-methyl-3-buten-2-ol (isoprenealcohol) and a monomer which is formed with addition of 1 to 100 moles of ethylene oxide and/or propylene oxide to 1 mole of the forementioned unsaturated alcohol monomers (among them, isoprenol and polyethyleneglycol monoisoprenol ether are especially preferred.): and a monomer in a series of unsaturated allyl ethers, which is shown by the general formula (2),

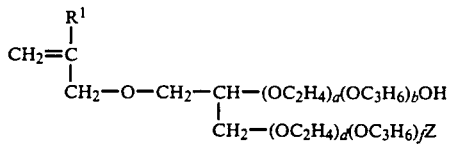

(2)

(but in the formula, $R^1$ represents a hydrogen atom or a methyl group, a, b, d, and f independently represent 0 or a positive integral number and the total of a, b, d, and f is 0 to 100, the units $-(OC_2H_4)=$ and $-(OC_3H_6)-$ may be combined in any order, Z is a hydroxyl, sulfonic acid, or phosphoric (or phosphorous) acid group when the sum of d and f is 0, and Z is a hydroxyl group when the sum of d and f is a positive integral number of 1 to 100.), for example, 3-(meth)allyloxy-2-hydroxypropanesulfonic acid, 3-(meth)allyoxy-2-hydroxypropanephosphorous acid, glycerol monoallyl ether, and a monomer which is formed with addition of 1 to 100 moles of ethylene oxide and/or propylene oxide to 1 mole of the forementioned allyl ether monomers (among them, 3-allyloxy-2-hydroxypropanesulfonic acid and glycerol monoallyl ether are especially preferred) and the like. In the case where these monomers are used, the dispersion ability of a detergent against a dirty component and the protective property of a scale inhibitor for attaching and so on are elevated, very preferably as a detergent builder and a scale inhibitor.

Besides, although in this invention a monomer in the salt form, which is neutralized with an alkaline substance, is possible for use as the maleic acid (A) and water-soluble ethylenically unsaturated monomer (B), in a case of that the monomer of a salt form is used, it is necessary to use an amount such that the neutralization extent for the whole acid group at the time of polymerization is up to 45 mole %.

Furthermore, a maleic acid (co-)polymer in the acid form, which is obtained without use of an alkaline substance, and a maleic acid (co-)polymer salt which is obtained from neutralization of the above polymer with an alkaline substance, even if the neutralization extent is 45 mole % or less, shows low biodegradability.

According to the process of this invention, a maleic acid (co-)polymer salt of 300 to 8,000 in molecular weight is usually obtained.

Why the maleic acid (co-)polymer salt obtained from the process described in this invention shows superior biodegradability is not yet clear, but it is guessed as follows. That is, decarbonylation takes place during polymerization and, as a result, a carbonyl group is formed in a main chain of the maleic acid (co-)polymer salt. Otherwise, an ether bond is formed in a main chain of the maleic acid (co-)polymer salt because a specially defined amount of a specially defined catalyzer for polymerization is used in a range of a specially defined neutralization extent and a specially defined polyvalent metal ion is used in a specially defined amount. Either one or both of the carbonyl structure and the ether bond is guessed to have a great effect on an increase of the biodegradability and an increase of properties as a detergent builder and a scale inhibitor and the like.

Accordingly, in the process for producing this invention, a maleic acid (co-)polymer salt, substantially improved in biodegradability, is obtained with high efficiency by using a definite amount in a range of hydrogen peroxide as a polymerization catalyzer under a condition of a specially defined neutralization extent and in the presence of a specially defined polyvalent metal ion, and that the (co-)polymer salt has superior properties as a detergent builder and a scale inhibitor etc. which could not have been predicted at all from the hitherto known conventional art.

The maleic acid (co-)polymer salt obtained from the process for producing this invention shows no toxicity and much improved biodegradability compared with that of the hitherto known polycarboxylic acid salts and, for example, in a case where it is used in large quantity as a detergent builder and a scale inhibitor, an important problem, such as accumlation in circumstances, can be greatly improved and, therefore, it is of very high utility in an industrial viewpoint.

DESCRIPTION OF THE INVENTION

Hereinafter, although the present invention is concretely explained with the examples, it is not limited to the examples. Besides, the % and part in the examples indicate the weight % and weight part, respectively.

EXAMPLE 1

Into a 1 l four-neck flask equipped with a therometer, a stirrer, and a reflux condenser were placed 196 parts of maleic anhydride (232 parts as maleic acid), 75.1 part of deionized water, 0.0138 parts of vanadyl sulfate dihydrate (as $VO_2+$, 20 ppm against the weight of the monomer component), and 66.7 parts of a 48% aqueous sodium hydroxide solution (20 mole % against the whole acid group of the monomer component) and, with stirring, the aqueous solution was brought to boiling temperature under ordinary pressure. Next, 113.4 parts of a 60% hydrogen peroxide solution (34 g against 1 mole of the monomer component) was added dropwise continuously during 3 hours and a polymerization reaction was carried out. After completion of the additions, the reaction mixture was stirred for a further 1 hour at the boiling point of the mixture to complete the polymerization reaction, whereby a maleic acid polymer salt (1) of a 53% solid component was obtained, which was analyzed by gel permeation chromatography for determination of the amount of the residual monomer and the molecular weight of the produced polymer:

Besides, the biodegradation percentage (%) of the maleic acid polymer salt (1) obtained is determined by the following equation.

$$X = \frac{A - B}{C - D} \times 100$$

X: Biodegradation percentage (%) during 5 days
A: Amount of oxygen biologically required by a maleic acid (co-)polymer (salt) during 5 days (BOD5) (*1)
B: Amount of oxygen biologically required by a residual monomer during 5 days (*2)
C: Amount of oxygen theoretically required by a maleic acid (co-)polymer (salt) (*3)
D: Amount of oxygen theoretically required by a residual monomer (*1) It was determined with the undermentioned method which is in turn due to the Japanese Industrial Standard; JIS K0102.

At first, to 1 l of distilled water, wherein the water temperature was adjusted to about 20° C. and dissolving oxygen was saturated, were added 1 ml of a buffer solution of pH 7.2 containing 21.75 g/l of dipotassium hydrogenphosphate (potassium hydrogen phosphate), 8.5 g/l of potassium dihydrogenphosphate, 44.6 g/l of disodium hydrogenphosphate 12-hydrate (sodium hydrogenphosphate 12-hydrate), and 1.7 g/l 12-hydrate), and 1.7 g/l of ammonium chloride, respectively, 1 ml of an aqueous magnesium sulfate solution containing 22.5 g/l of magnesium sulfate 7Ohydrate, 1 ml of an aqueous calcium chloride solution containing 27.5 g/l of anhydrous calcium chloride, and 1 ml of an aqueous ferric chloride solution containing 0.25 g/l of ferric chloride 6-hydrate, whereby a diluted aqueous solution of pH 7.2 was prepared. Besides, this diluted aqueous solution was filled in the undermentioned bottle for cultivation and allowed to stand for 5 days in a thermostate of 20° C., thereby it was confirmed that difference in the amounts of dissolved oxygen between the initial time and after 5 days is 0.2 mg °/l or less.

Next, a diluted solution for innoculating was prepared by that a solution for innoculating composed of a supernatant fluid of a drain, a river water, a soil-extracting solution and the like was added to said diluted aqueous solution.

Next, using a siphon and giving attention to that a bubbie does not enter in, said diluted aqueous solution or the diluted solution for innoculating was filled up to about a half of 1 l messcylinder of a common stoper (in a case of that the undermentioned bottle for cultivation is 200 ml or more, a 2 l messcylinder of a common stopper is used). To this messcylinder was added a sample of proper amount and, to this, said diluted aqueous solution or the diluted solution for innoculating was added up to a 1 l symbol line (a 2 l symbol line in a case of that the messcylinder of a common stopper is 2 l), stopped, and quietly mixed. Four or five kinds of diluted samples in which the dilution magnification differs stepwise were prepared by that a similar procedure was repeated with changing the amount of the sample or diluting a diluted sample again.

For each one kind of the diluted samples thus-prepared, respectively, 2∼4 pieces of 100∼300 ml bottles for cultivation, whose volumes are exactly known, made of a glass and equipped with a thin common stopper, whose top is cut obliquely, were arranged and, using a siphon, said diluted samples were transferred into the bottles to fill with overflow and tightly stoppered.

Said diluted samples were allowed to stand for 15 minutes after being prepared, and an amount of dissolved oxygen was determined with a dissolved oxygen meter (D/O meter).

Said diluted samples were cultivated for 5 days in a thermostat or in a water bath of constant temperature whose temperature was adjusted at 20°±1° C. and then, an amount of dissolved oxygen was determined as carried out above.

With the following equation, the BOD5 (mg°/l) was calculated of the sample from the dissolved oxygen amounts at before and after caltivation.

$$BOD5 = \frac{(D_1 - D_2) - (B_1 - B_2) \times f}{P}$$

Here, BOD5: an amount of oxygen consumed in a sense of biological chemistry when being cultivated for 5 days (mg°/l).

$D_1$: an amount of oxygen dissolved in a diluted sample at 15 minutes later since it is prepared (mg°/l).

$D_2$: an amount of oxygen dissolved in a diluted sample after cultivation (mg°/l).

P: proportion of a sample in a diluted sample (a ratio of a sample to a diluted sample).

$B_1$: an amount of oxygen dissolved in a diluted solution for innoculating before cultivation when BOD5 of the solution for innoculating is determined (mg°/l).

$B_2$: an amount of oxygen dissolved in a diluted solution for innoculating after cultivation when BOD5 of the solution for innoculating is determined (mg°/l).

$$f: \frac{x}{y}$$

x: a solution for innoculating in a diluted sample when BOD5 of a sample is determined (%).
y: a solution for innoculating in a diluted solution for innoculating when BOD5 of a solution for innoculating is determined (%).

(*2) The residual monomer amount is quantitatively analyzed with a gel permeation chromatography. The amount of oxygen in each monomer component biologically required is determined according to the same method as in the case of the maleic acid (co-)polymer (salt) and the amount of oxygen in the whole residual monomer biologically required is obtained by calculation.

(*3) The amount of oxygen necessary for complete oxydation was determined from the elementary analysis data of each maleic acid (co-)polymer (salt).

These results are shown in Table 1.

EXAMPLE 2

The procedure of example 1 was repeated to obtain the maleic acid polymer salt (2) except that the amount of 48% aqueous sodium hydroxide solution in the example 1 was changed to 117 parts (35 mole % against the whole acid group of a monomer component). The maleic acid polymer salt (2) obtained was analyzed in the same way as carried out in the example 1, and the results obtained are shown in Table 1.

EXAMPLE 3

The procedure of example 1 was repeated to obtain the maleic acid polymer salt (3) except that the amount of the 60% hydrogen peroxide solution in the example 1 was changed to 50 parts (15 g against 1 mole of a monomer component) and 0.0412 parts of ammonium ferric sulfate 12-hydrate (as $Fe^{3+}$, 20 ppm against the weight of a monomer component) was used in place of vanadyl sulfate. The maleic acid polymer salt (3) obtained was analyzed in the same way as carried out in the example 1, and the results obtained are shown in Table 1.

EXAMPLES 4∼6

The procedure of example 1 was repeated to obtain the maleic acid polymer salts (4)∼(6) except that ammonium ferric sulfate 12-hydrate was used in an amount shown in Table 1 instead of vanadyl sulfate and the amounts for use of a 48% aqueous sodium hydroxide solution and the hydrogen peroxide were such as indicated in Table 1. The maleic acid polymer salts (4)∼( ) were analyzed as carried out in the example 1, and the results obtained are shown in Table 1.

EXAMPLE 7

The procedure of example 1 was repeated to obtain the maleic acid polymer salt (7) except that 0.0335 part of ammonium ferrous sulfate 6-hydrate (as $Fe^{2+}$, 20 ppm against the weight of a monomer component) was used instead of vanadyl sulfate. The maleic acid polymer salt (7) obtained was analyzed as carried out in the example 1, and the results obtained are shown in Table 1.

EXAMPLE 8

The procedure of example 1 was repeated to obtain the maleic acid polymer salt (8) except that cupric sulfate was used in the amount shown in Table 1 instead of vanadyl sulfate and a 10% aqueous sodium carbonate solution was used in the amount shown in Table 1 instead of the 48% aqueous sodium hydroxide solution. The maleic acid polymer salt (8) obtained was analyzed as carried out in the example 1, and the results obtained are shown in Table 1.

EXAMPLE 9

In a vessel for polymerization as used in the example 1 were placed 232 parts of maleic acid, 39.1 parts of water, 0.0506 parts of ammonium ferric sulfate 12-hydrate (as $Fe^{3+}$, 20 ppm against the weight of a monomer component), and 66.7 parts of a 48% aqueous sodium hydroxide solution (20 mole % against the whole acid group of a monomer component) and, with stirring, the aqueous solution was warmed up to the boiling point under ordinary pressure. Then, with stirring, a mixture of 151.6 parts of 60% hydrogen peroxide (34 g. against 1 mole of a monomer component) and, as the other water-soluble unsaturated monomer (B), 58 parts of 3-methyl-3-buten-1-ol (isoprenol) (a weight ratio between maleic acid and the water-soluble unsaturated monomer (B) was 80 to 20) was continuously added dropwise during 3 hours to carry out polymerization reaction. After the addition finished, the reaction mixture was further stirred for 1 hour at the boiling temperature to complete polymerization reaction, whereby the maleic acid copolymer salt (9) was obtained. The maleic acid copolymer salt (9) obtained was analyzed as carried out in the example 1, and the results obtained are shown in Table 1.

EXAMPLES 10~15

The procedure of example 9 was repeated to obtain the maleic acid copolymer salts (10)~(15) except that the kind and amount for use of the polyvalent metal ion, the amount for use of the 48% aqueous sodium hydroxide solution, and the amount for use of the 60% hydrogen peroxide in the example 9 were as shown in Table 1. The maleic acid copolymer salts (10)~(15) obtained were analyzed as carried out in the example 1, and the results obtained in Table 1.

EXAMPLE 16

The procedure of example 9 was repeated to obtain the maleic acid copolymer salt (16) except that 153 parts of a 50% aqueous sodium acrylate solution (as acrylic acid, 58 parts) was used instead of 3-methyl-3-buten-1-ol and the amounts for use of the 48% aqueous sodium hydroxide solution and 60% hydrogen perioxide were as shown in Table 1. The maleic acid copolymer salt (16) obtained was analyzed as carried out in the example 1, and the results obtained are shown in Table 1.

EXAMPLES 17~25

The procedure of example 9 was repeated to obtain the maleic acid copolymer salts (17)~(25) except that the other water-soluble unsaturated monomers (B) as shown in Table 1 were used in the amounts described in Table 1 instead of 3-methyl-3-buten-1-ol and the kind and amount for use of the polyvalent metal ion and the amounts for use of the 48% aqueous sodium hydroxide solution and 60% hydrogen peroxide were as shown in Table 1. The maleic acid copolymer salts (17)~(25) were analyzed as carried out in the example 1, and the results obtained are shown in Table 1.

EXAMPLES 26~28

The procedure of example 9 was repeated to obtain the maleic acid copolymer salts (26)~(28) except that the other water-soluble unsaturated monomers (B) as shown in Table 1 were used in the amounts described in Table 1 instead of 3-methyl-3buten-1-ol and a 10% aqueous sodium carbonate solution was used in an amount shown in Table 1 instead of the 48% aqueous sodium hydroxide solution and the amount for use of 60% of hydrogen peroxide was as shown in Table 1. The maleic acid copolymer salts (26)~(28) obtained were analyzed as carried out in the example 1, and the results obtained are shown in Table 1.

EXAMPLE 29

In a vessel for polymerization same as used in the example 1 were placed 232 parts of maleic acid, 10 parts of water, 0.0412 parts of ammonium ferric sulfate 12-hydrate (as $Fe^{3+}$, 20 ppm against the weight of a monomer component), and 66.7 parts of a 48% aqueous sodium hydroxide solution (20 mole % against the whole acid group of a monomer component) and then, the procedure of example 1 was repeated to obtain the maleic acid polymer salt (29). The maleic acid polymer salt (29) was analyzed as carried out in the example 1, and the results obtained are shown in Table 1.

EXAMPLES 30 AND 31

The procedure of example 9 was repeated to obtain the maleic acid copolymer salts (30) and (31) except that the other water-soluble unsaturated monomers (B) as shown in Table 1 were used in the amounts shown in Table 1 instead of 3-methyl-3-buten-1-ol and the amounts for use of the 48% aqueous sodium hydroxide solution and the 60% hydrogen peroxide were as shown in Table 1. The maleic acid copolymer salts (30)~(31) obtained were analyzed as carried out in the example 1, and the results obtained are shown in Table 1.

Examples for Comparison 1~3

The procedure of example 1 was repeated to obtain the maleic acid polymer salts for comparison (1)~(3) except that the kind and amount for use of the polyvalent metal ion, the amount for use of the 48% aqueous sodium hydroxide solution, and the amount for use of the 60% of hydrogen peroxide solution were as shown in Table 2. The maleic acid polymer salts for comparison (1)~(3) obtained were analyzed as carried out in the example 1, and the results obtained are shown in Table 2.

Examples for Comparison 4~14

The procedure of example 9 was repeated to obtain the maleic acid copolymer salts for comparison (4)~(14) except that the other water-soluble unsaturated monomers (B) as shown in Table 2 were used in the amounts described in Table 2, the kind and amount for use of the polyvalent metal ion, and the amounts for use of the 48% aqueous sodium hydroxide solution and 60% hydrogen peroxide solution were as shown in Table 2. The maleic acid copolymer salts for comparison (4)~(14) were analyzed as carried out in the example 1, and the results obtained are shown in Table 2.

Example for Comparison 15

In an apparatus similar to that used in the example 1 were placed 196 parts of maleic anhydride, 131 parts of monochlorobenzene, and 65.4 parts of xylene and the mixture obtained was warmed up to 140° C. To this mixture a solution for dropping 1 composed of 65.4 parts of ditertiary-butyl peroxide, 41 parts of xylene, and 65.4 parts of monomchlorobenzene, and another solution for dropping 2 composed of 26 parts of acrylic acid were added dropwise during 3 hours and then, the reaction was completed by treating under reflux for 3 hours. After the solvent was distilled off, a hydrolysis reaction was carried out with addition of 197 parts of pure water, whereby the maleic acid copolymer for comparison (15) was obtained. This maleic acid copolymer for comparison (15) was analyzed as carried out in the example 1, and the results obtained are shown in Table 2.

Example for Comparison 16

In a vessel for polymerization which was the same as that used in the example 1 were placed 196 parts of maleic anhydride and 300 parts of water (232 parts as maleic acid) and the mixture obtained was warmed up to 60° C. with stirring. The warming was stopped, and 138 parts of a 30% aqueous sodium hydroxide solution and then 140 parts of isopropanol were added. The, temperature of the reaction mixture was raised to the refluxing temperature and, after 0.25 parts of a 4.98% aqueous solution of ferrous sulfate ($FeSO_4 \cdot 7H_2O$) (1% as $FE^{2+}$) was added, 40 parts of a 60% hydrogen peroxide solution were added dropwise during 6 hours. After the addition finished, further warming was carried out for 2 hours, whereby the maleic acid copolymer salt for comparison (16) was obtained, which was analyzed as carried out in the example 1, and the results obtained are shown in Table 2.

Examples for Comparison 17

In a vessel for polymerization, which was the same as used in example 1, were placed 12.9 parts of 1-allyloxy-2-,3-dihydroxypropane (glycerol monoallyl ether), 116 parts of maleic acid, 166.6 parts of a 48% aqueous sodium hydroxide solution, and 157.4 parts of water and the aqueous solution thus-formed was warmed up to the boiling point. To this solution, 100 parts of a 10% aqueous ammonium persulfate solution were added dropwise from a dropping funnel during 2 hours and, during the addition, the temperature of polymerization was always controlled at the boiling point of this reaction system. Next, the polymerization was completed by maintaining the system at the temperature for 30 minutes, whereby the maleic acid copolymer salt for comparison (17) was obtained, which was analyzed as carried out in the example 1, and the results obtained are shown in Table 2.

Example for Comparison 18

The procedure of example 1 was repeated to obtain the maleic acid polymer for comparison (18) except that the 48% aqueous sodium hydroxide solution was not used at all. This maleic acid polymer for comparison (18) was analyzed as carried out in the example 1, and the results obtained are shown in Table 2.

Example for Comparison 19

The maleic acid polymer salt for comparison (19) was obtained by that the maleic acid polymer for comparison (18) obtained from the example for comparison 18 was neutralized with 66.7 parts of a 48% aqueous hydroxide solution. This maleic acid polymer salt for comparison (19) was analyzed as carried out in the example 1, and the results obtained are shown in Table 2.

Example for Comparison 20

The procedure of example 9 was repeated to obtain the maleic acid copolymer salt for comparison (20) except that the other water-soluble unsaturated monomer (B) as shown in Table 2 was used in the amount described in Table 2 and the kind and amount for use of the polyvalent metal ion and the amounts for use of the 48% aqueous sodium hydroxide solution and the 60% hydrogen peroxide were as shown in Table 2. The maleic acid copolymer salt for comparison (20) was analyzed as carried out in the example 1, and the results obtained are shown in Table 2.

Examples for Comparison 21 and 22

In a vessel for polymerization which was the same as used in example 1 were placed 232 parts of maleic acid, 200 parts of water, 0.0412 parts of ammonium ferric sulfate 12 hydrate (as $Fe^{3+}$, 20 ppm against the weight of a monomer component), and 66.7 parts of a 48% aqueous sodium hydroxide solution (20 mole % against the whole acid group of a monomer component). The, the procedure of example 9 was repeated to obtain the maleic acid copolymer salts for comparison (21) and (22) except that the other water-soluble unsaturated monomers (B) as shown in Table 2 were used in the amounts described in Table 2. The maleic acid copolymer salts for comparison (21) and (22) were analyzed as carried out in the example 1, and the results obtained are shown in Table 2.

TABLE 1

| Example | maleic acid (co-)polymer salt | (polyvalent) metal ion (ppm against weight of monomer component) | other water-soluble unsaturated monomer (B) | weight ratio between maleic acid and (B) | alkaline substance (mole % against whole acid group of monomer component) |
| --- | --- | --- | --- | --- | --- |
| 1 | (1) | $VO^{2+}$ (20) | — | 100/0 | 20 (sodium hydroxide) |
| 2 | (2) | $VO^{2+}$ (20) | — | 100/0 | 35 (sodium hydroxide) |
| 3 | (3) | $Fe^{3+}$ (20) | — | 100/0 | 20 (sodium hydroxide) |
| 4 | (4) | $Fe^{3+}$ | — | 100/0 | 20 |

TABLE 1-continued.

| | | | | | |
|---|---|---|---|---|---|
| 5 | (5) | Fe$^{3+}$ (20) | — | 100/0 | (sodium hydroxide) 20 |
| 6 | (6) | Fe$^{3+}$ (2) | — | 100/0 | (sodium hydroxide) 20 |
| 7 | (7) | Fe$^{2+}$ (300) | — | 100/0 | (sodium hydroxide) 20 |
| 8 | (8) | Cu$^{2+}$ (20) | — | 100/0 | (sodium hydroxide) 5 |
| 9 | (9) | Fe$^{3+}$ (20) | isoprenol | 80/20 | (sodium hydroxide) 20 |
| 10 | (10) | Fe$^{3+}$ (20) | isoprenol | 80/20 | (sodium hydroxide) 40 |
| 11 | (11) | Fe$^{3+}$ (20) | isoprenol | 80/20 | (sodium hydroxide) 20 |
| 12 | (12) | VO$^{2+}$ (20) | isoprenol | 80/20 | (sodium hydroxide) 20 |
| 13 | (13) | Fe$^{2+}$ (2) | isoprenol | 80/20 | (sodium hydroxide) 20 |
| 14 | (14) | Fe$^{3+}$ (20) | isoprenol | 80/20 | (sodium hydroxide) 20 |
| 15 | (15) | Cu$^{2+}$ (300) | isoprenol | 80/20 | (sodium hydroxide) 20 |
| 16 | (16) | Fe$^{3+}$ (20) | acrylic acid | 80/20 | (sodium hydroxide) 20 |
| 17 | (17) | Fe$^{3+}$ (20) | acrylic acid | 75/25 | (sodium hydroxide) 20 |
| 18 | (18) | Fe$^{3+}$ (20) | isoprenol 5 EO addition compound | 80/20 | (sodium hydroxide) 20 |
| 19 | (19) | Fe$^{3+}$ (20) | 3-allyloxy-2-hydroxy propanesulfonic acid | 80/20 | (sodium hydroxide) 20 |
| 20 | (20) | Fe$^{3+}$ (20) | glycerol monoallyl ether | 80/20 | (sodium hydroxide) 20 |
| 21 | (21) | VO$^{2+}$ (20) | monomethyl maleate | 80/20 | (sodium hydroxide) 20 |
| 22 | (22) | VO$^{2+}$ (20) | glycerol monoallyl ether EO 5 moles addition compound | 80/20 | (sodium hydroxide) 20 |
| 23 | (23) | VO$^{2+}$ (20) | allyl alcohol EO 5 moles addition compound | 80/20 | 20 (sodium hydroxide) |
| 24 | (24) | VO$^{2+}$ (20) | 2-acrylamido-2-methylpropane-sulfonic acid | 80/20 | 20 (sodium hydroxide) |
| 25 | (25) | VO$^{2+}$ (20) | methacrylic acid | 75/25 | 20 (sodium hydroxide) |
| 26 | (26) | Fe$^{3+}$ (20) | fumaric acid monosodium salt | 80/20 | 20 (sodium carbonate) |
| 27 | (27) | Fe$^{3+}$ (20) | itaconic acid | 80/20 | 20 (sodium carbonate) |
| 28 | (28) | Fe$^{3+}$ (20) | polyethyleneglycol monoisoprenol ether | 80/20 | 20 (sodium carbonate) |
| 29 | (29) | Fe$^{3+}$ (20) | — | 100/0 | 20 (sodium hydroxide) |
| 30 | (30) | Fe$^{3+}$ (20) | 2-acrylamido-2-methylpropane-sulfonic acid | 80/20 | 20 (sodium hydroxide) |
| 31 | (31) | Fe$^{3+}$ (20) | acrylic acid | 80/20 | 20 (sodium hydroxide) |

| Example | hydrogen peroxide (g against 1 mole of monomer component) | amount of residual monomer (%) | biodegradation percentage (%) | molecular weight |
|---|---|---|---|---|
| 1 | 34 | 0.3 | 34 | 980 |
| 2 | 34 | 0.6 | 27 | 1200 |
| 3 | 15 | 3 | 20 | 1500 |
| 4 | 100 | 0.3 | 37 | 550 |
| 5 | 34 | 3 | 25 | 980 |
| 6 | 34 | 1 | 25 | 1800 |
| 7 | 34 | 0.5 | 31 | 1010 |
| 8 | 34 | 5 | 26 | 720 |
| 9 | 34 | 0.2 | 32 | 2500 |
| 10 | 34 | 0.5 | 28 | 3600 |
| 11 | 15 | 1 | 19 | 3700 |
| 12 | 34 | 0.9 | 22 | 3000 |
| 13 | 34 | 0.7 | 25 | 3100 |
| 14 | 34 | 3 | 31 | 4100 |
| 15 | 34 | 3 | 29 | 2600 |
| 16 | 34 | 0.2 | 26 | 3200 |
| 17 | 20 | 1 | 20 | 5500 |
| 18 | 34 | 0.4 | 30 | 2400 |
| 19 | 34 | 0.3 | 29 | 2800 |

TABLE 1-continued

| | | | | |
|---|---|---|---|---|
| 20 | 34 | 0.5 | 30 | 2700 |
| 21 | 34 | 0.4 | 31 | 140 |
| 22 | 34 | 0.4 | 29 | 2500 |
| 23 | 34 | 0.3 | 28 | 2700 |
| 24 | 34 | 0.3 | 26 | 2900 |
| 25 | 20 | 3 | 20 | 4200 |
| 26 | 34 | 2 | 30 | 1500 |
| 27 | 34 | 2 | 29 | 1600 |
| 28 | 34 | 2 | 31 | 3000 |
| 29 | 34 | 1 | 36 | 2000 |
| 30 | 34 | 0.8 | 28 | 2900 |
| 31 | 34 | 0.3 | 26 | 3300 |

TABLE 2

| Example for comparison | maleic acid (co-)polymer (salt) for comparison | (polyvalent) metal ion (ppm against weight of monomer component) | other water-soluble unsaturated monomer (B) | weight ratio between maleic acid and (B) | sodium hydroxide (mole % against whole acid group of monomer component) |
|---|---|---|---|---|---|
| 1 | (1) | $VO^{2+}$ (20) | — | 100/0 | 50 |
| 2 | (2) | $VO^{2+}$ (20) | — | 100/0 | 20 |
| 3 | (3) | absence | — | 100/0 | 20 |
| 4 | (4) | $Fe^{3+}$ (20) | isoprenol | 80/20 | 50 |
| 5 | (5) | $Fe^{3+}$ (20) | isoprenol | 80/20 | 20 |
| 6 | (6) | absence | isoprenol | 80/20 | 20 |
| 7 | (7) | $Mn^{2+}$ (20) | isoprenol | 80/20 | 20 |
| 8 | (8) | $Co^{2+}$ (20) | isoprenol | 80/20 | 20 |
| 9 | (9) | $Mg^{2+}$ (20) | isoprenol | 80/20 | 20 |
| 10 | (10) | $Ni^{2+}$ (20) | isoprenol | 80/20 | 20 |
| 11 | (11) | $Zn^{2+}$ (20) | isoprenol | 80/20 | 20 |
| 12 | (12) | $Fe^{3+}$ (20) | 2-acrylamido-2-methylpropane-sulfonic acid | 50/50 | 20 |
| 13 | (13) | $Fe^{3+}$ (20) | acrylic acid | 50/50 | 20 |
| 14 | (14) | $Fe^{3+}$ (2000) | acrylic acid | 80/20 | 20 |
| 15 | (15) | absence | acrylic acid | 90/10 | 0 |
| 16 | (16) | $Fe^{2+}$ (9.7) | acrylic acid | 90/10 | 23.7 |
| 17 | (17) | absence | glycerol monoallyl ether | 90/10 | 100 |
| 18 | (18) | $VO^{2+}$ (20) | — | 100/0 | 0 |
| 19 | (19) | $VO^{2+}$ (20) | — | 100/0 | 20 (added after polymerization) |
| 20 | (20) | $Fe^{2+}$ (20) | acrylic acid | 40/60 | 50 |
| 21 | (21) | $Fe^{3+}$ (20) | acrylic acid | 50/50 | 20 |
| 22 | (22) | $Fe^{3+}$ (20) | 2-acrylamido-2-methylpropane-sulfonic acid | 50/50 | 20 |

| Example for comparison | hydrogen peroxide (g against 1 mole of monomer component) | amount of residual monomer (%) | biodegradation percentage (%) | molecular weight |
|---|---|---|---|---|
| 1 | 34 | 2 | 3 | 2100 |
| 2 | 10 | 19 | 8 | 2200 |
| 3 | 34 | 45 | 8 | 1050 |
| 4 | 34 | 2 | 2 | 2800 |
| 5 | 10 | 16 | 8 | 2600 |
| 6 | 34 | 35 | 7 | 2400 |
| 7 | 34 | 29 | 8 | 2500 |
| 8 | 34 | 30 | 7 | 2700 |
| 9 | 34 | 27 | 6 | 2700 |
| 10 | 34 | 28 | 8 | 2500 |
| 11 | 34 | 31 | 7 | 2600 |
| 12 | 34 | 5 | 8 | 5500 |
| 13 | 34 | 3 | 8 | 580 |
| 14 | 34 | 7 | 8 | 5200 |

TABLE 2-continued

| | | | | |
|---|---|---|---|---|
| 15 | di-t-butyl peroxide (27.7) | 20 | 3 | 1800 |
| 16 | hydrogen peroxide (10.2) | 25 | 3 | 1000 |
| 17 | ammonium persulfate (9.1) | 12 | 3 | 1800 |
| 18 | hydrogen peroxide (34) | 0.3 | 14 | 1200 |
| 19 | 34 | 0.3 | 15 | 1200 |
| 20 | 2.19 | 0.3 | 1 | 6000 |
| 21 | 34 | 6 | 9 | 2800 |
| 22 | 34 | 8 | 9 | 2500 |

As seen in Tables 1 and 2, the maleic acid (co-) polymer salt relating to the examples, compared with the maleic acid (co-)polymer (salt) relating to the examples for comparison, is less in amount of the residual monomer and superior in biodegradability. Also, when the results in Tables 1 and 2 are examined, comparing in detail, from a standpoint of difference in the reaction conditions between the examples and the examples for comparison, the undermentioned 1~5 are seen.

1) With increasing the content of maleic acid, the biodegradability increases (from comparison between the examples 29 and 30 and the example for comparison 12, and between the examples 29 and 31 and the example for comparison 13).

2) If the amount of the polyvalent metal ion is too large or small, the biodegradability lowers (from comparison between the examples 5, 6, and 29 and the example for comparison 3, between the examples 9 and 14 and the example for comparison 6, and between the example 16 and the example for comparison 14).

3) When a metal ion other than a vanadium ion, iron ion, and copper ion is used, the amount of the residual monomer increases and the biodegradability lowers (from comparison between the examples 9 and 15 and the examples for comparison 7~11).

4) If the neutralization extent for the whole acid group in the monomer component is 0 mole % or exceeds 45 mole %, the biodegradability lowers (from comparison between the examples 1 and 2 and the examples for comparison 1, 18, and 19, and between the examples 9 and 10 and the example for comparison 4).

5) If the amount of hydrogen peroxide is too small, the biodegradability lowers (from comparison between the examples 3, 4, and 29 and the example for comparison 2, and between the examples 9 and 11 and the example for comparison 5).

EXAMPLES 32~62

To evaluate the properties of maleic acid (co-)polymer salts obtained from the examples 1~31, as a scale inhibitor, the undermentioned examinations were carried out. With 170 g of water placed in a glass bottle of 225 ml volume, 10 g of a 1.56% aqueous calcium chloride 2-hydrate solution and 3 g of a 0.02% aqueous solution of the maleic acid (co-)polymer salts (1)~(31) (3 ppm against an over saturated aqueous solution obtained) were mixed and, with further additions of 10 g of a 3% aqueous sodium hydrogencarbonate solution and 7 g of water, the total amount was adjusted to 200 g. The over saturated aqueous solution thus-obtained containing 530 ppm of sodium carbonate was tightly stoppered and treated with heating at 70° C. for 3 hours. Then, after cooling the precipitate is taken off with filtration using a membrane filter of 0.1 μ and the filtrate was analyzed.

According to the undermentioned chelate-titrating method, which is in true due to Japanese Industrial Standard: JIS K0101, the calcium concentration in the filtrate was determined.

In a beaker was placed a proper amount of a filtrate (which contained 5 mg or less as Ca) and the volume was adjusted to about 50 ml with addition of water. To this was added r ml of a 500 g/l aqueous potassium hydroxide solution and the solution obtained was well mixed and stood for 5 minutes, to which 0.5 ml of a 100 g/l aqueous potassium cyanide solution and 0.5 ml of a 100 g/l aqueous hydroxyl ammonium chloride (hydroxylamine hydrochloride) solution were added. Well mixing of the solution obtained gave a sample for titrating.

To a sample for titrating thus-obtained were added 5~6 drops of an aqueous solution (a NANA solution) containing 5 g/l of both 2-hydroxy-1-(2'-hydroxy-4'-sulfo-1'-naphthalenylazo)-3-naphthalenecarboxylic acid and hydroxylammonium chloride, and the solution obtained was titrated until the color becomes from reddish violet to blue with a 1/100 mole/~ aqueous disodium ethylenediamine-tetraacetate solution (a EDTA solution in which 1 m~ corresponds to 0.4 mg of calcium). Besides the EDTA solution used for titration was prepared by that disodium ethylenediaminetetraacetate 20hydrate was dried at 80° C. for 5 hours and stood for cooling in a desiccator, then 3.722 g of it was placed in a 1 ~ flask and dissolved into water which was added up to a mark line of the flask.

With the following equation, the calcium concentration (mgCa/~) in the filtrate was calculated.

$$C = a \times \frac{1000}{V} \times 0.4$$

Here, C: calcium concentration (mgCa/~)
  a: amount of a EDTA solution required for titration (m~)
  V: amount of a filtrate used for titration (m~)
  0.4: amount of calcium which corresponds to 1 m~ of the EDTA solution (mg)

According to the following equation, the scale inhibition percentage % for calcium carbonate was determined. The results obtained are shown in Table 3.

$$\text{Scale inhibition percentage (\%)} = \frac{C - B}{A - B} \times 100$$

A: calcium concentration dissolving in a solution before examination.
B: calcium concentration in a filtrate without addition of a scale inhibitor.
C: calcium concentration in a filtrate after examination

Examples for Comparison 23~44

In the same way as carried out for the examples 32~62, the properties as a scale inhibitor of the maleic acid (co-)polymers (salts) for comparison (1)~(22) obtained from the examples for comparison 1~22 were evaluated. The results obtained are shown in Table 4.

TABLE 3

| Example | maleic acid (co-)polymer salt used | scale inhibitor percentage for calcium carbonate (%) |
|---|---|---|
| 32 | maleic acid polymer salt (1) | 88 |
| 33 | maleic acid polymer salt (2) | 82 |
| 34 | maleic acid polymer salt (3) | 77 |
| 35 | maleic acid polymer salt (4) | 87 |
| 36 | maleic acid polymer salt (5) | 80 |
| 37 | maleic acid polymer salt (6) | 80 |
| 38 | maleic acid polymer salt (7) | 85 |
| 39 | maleic acid polymer salt (8) | 82 |
| 40 | maleic acid copolymer salt (9) | 89 |
| 41 | maleic acid copolymer salt (10) | 88 |
| 42 | maleic acid copolymer salt (11) | 77 |
| 43 | maleic acid copolymer salt (12) | 80 |
| 44 | maleic acid copolymer salt (13) | 86 |
| 45 | maleic acid copolymer salt (14) | 80 |
| 46 | maleic acid copolymer salt (15) | 80 |
| 47 | maleic acid copolymer salt (16) | 87 |
| 48 | maleic acid copolymer salt (17) | 82 |
| 49 | maleic acid copolymer salt (18) | 88 |
| 50 | maleic acid copolymer salt (19) | 86 |
| 51 | maleic acid copolymer salt (20) | 85 |
| 52 | maleic acid copolymer salt (21) | 74 |
| 53 | maleic acid copolymer salt (22) | 86 |
| 54 | maleic acid copolymer salt (23) | 73 |
| 55 | maleic acid copolymer salt (24) | 72 |
| 56 | maleic acid copolymer salt (25) | 84 |
| 57 | maleic acid copolymer salt (26) | 75 |
| 58 | maleic acid copolymer salt (27) | 73 |
| 59 | maleic acid copolymer salt (28) | 73 |
| 60 | maleic acid polymer salt (29) | 85 |
| 61 | maleic acid copolymer salt (30) | 80 |
| 62 | maleic acid copolymer salt (31) | 81 |

TABLE 4

| Example for comparison | maleic acid (co-)polymer (salt) used | scale inhibitor percentage for calcium carbonate (%) |
|---|---|---|
| 23 | maleic acid polymer salt for comparison (1) | 54 |
| 24 | maleic acid polymer salt for comparison (2) | 63 |
| 25 | maleic acid polymer salt for comparison (3) | 48 |
| 26 | maleic acid copolymer salt for comparison (4) | 52 |
| 27 | maleic acid copolymer salt for comparison (5) | 65 |
| 28 | maleic acid copolymer salt for comparison (6) | 51 |
| 29 | maleic acid copolymer salt for comparison (7) | 53 |
| 30 | maleic acid copolymer salt for comparison (8) | 52 |
| 31 | maleic acid copolymer salt for comparison (9) | 53 |
| 32 | maleic acid copolymer salt for comparison (10) | 55 |
| 33 | maleic acid copolymer salt for comparison (11) | 51 |
| 34 | maleic acid copolymer salt for comparison (12) | 48 |
| 35 | maleic acid copolymer salt for comparison (13) | 49 |
| 36 | maleic acid copolymer salt for comparison (14) | 45 |
| 37 | maleic acid copolymer for comparison (15) | 53 |
| 38 | maleic acid copolymer salt for comparison (16) | 58 |
| 39 | maleic acid copolymer salt for comparison (17) | 70 |
| 40 | maleic acid polymer for comparison (18) | 83 |
| 41 | maleic acid polymer salt for comparison (19) | 81 |
| 42 | maleic acid copolymer salt for comparison (20) | 51 |
| 43 | maleic acid copolymer salt for comparison (21) | 49 |
| 44 | maleic acid copolymer salt for comparison (22) | 49 |

EXAMPLES 63~93

To evaluate the properties of the maleic acid (co-)polymer salts (1)~(31) obtained from the examples 1~31, as a detergent builder, the undermentioned examinations were carried out. Into 50 m~ of a $10^{-3}$ mol/~ aqueous calcium chloride solution were added 10 mg (calculated on a basis of the solid portion) of the maleic acid (co-)polymer salts (1)~(31), obtained from the examples 1~31, and using an ion analyzer (MODEL 701) made by Orion Co., Ltd. and a calcium ion electrode, the amounts of calcium ion blocked by the maleic acid (co-)polymer salts (1)~(31) were determined and the chelating ability of each of the maleic acid (co-)polymer salts were measured with the following equation, and the results obtained are shown in Table 5.

$$\text{chelating ability} = \frac{\text{mg of calcium blocked (converted into } CaCO_3\text{)}}{\text{g of maleic acid (co-)polymer salt (converted into the solid portion)}}$$

Examples for Comparison 45~66

In the same way as carried out for the examples 63~93, maleic acid (co-)polymers (salts) for comparison (1)~(22) obtained from the examples for comparison 1~22 were evaluated in the properties when used as a detergent builder, and the results obtained are shown in Table 6.

TABLE 5

| Example | maleic acid (co-)polymer salt used | chelating ability (mgCaCO₃/g) |
|---|---|---|
| 63 | maleic acid polymer salt (1) | 280 |
| 64 | maleic acid polymer salt (2) | 330 |
| 65 | maleic acid polymer salt (3) | 250 |
| 66 | maleic acid polymer salt (4) | 275 |
| 67 | maleic acid polymer salt (5) | 245 |
| 68 | maleic acid polymer salt (6) | 255 |
| 69 | maleic acid polymer salt (7) | 260 |
| 70 | maleic acid polymer salt (8) | 250 |
| 71 | maleic acid copolymer salt (9) | 240 |
| 72 | maleic acid copolymer salt (10) | 305 |
| 73 | maleic acid copolymer salt (11) | 235 |
| 74 | maleic acid copolymer salt (12) | 240 |
| 75 | maleic acid copolymer salt (13) | 240 |
| 76 | maleic acid copolymer salt (14) | 250 |
| 77 | maleic acid copolymer salt (15) | 240 |
| 78 | maleic acid copolymer salt (16) | 255 |
| 79 | maleic acid copolymer salt (17) | 265 |
| 80 | maleic acid copolymer salt (18) | 240 |
| 81 | maleic acid copolymer salt (19) | 250 |
| 82 | maleic acid copolymer salt (20) | 250 |

TABLE 5-continued

| Example | maleic acid (co-)polymer salt used | chelating ability (mgCaCO$_3$/g) |
|---|---|---|
| 83 | maleic acid copolymer salt (21) | 210 |
| 84 | maleic acid copolymer salt (22) | 250 |
| 85 | maleic acid copolymer salt (23) | 215 |
| 86 | maleic acid copolymer salt (24) | 205 |
| 87 | maleic acid copolymer salt (25) | 265 |
| 88 | maleic acid copolymer salt (26) | 215 |
| 89 | maleic acid copolymer salt (27) | 210 |
| 90 | maleic acid copolymer salt (28) | 220 |
| 91 | maleic acid polymer salt (29) | 282 |
| 92 | maleic acid copolymer salt (30) | 260 |
| 93 | maleic acid copolymer salt (31) | 265 |

TABLE 6

| Example for comparison | maleic acid (co-)polymer (salt) used | chelating ability (mgCaCO$_3$/g) |
|---|---|---|
| 45 | maleic acid polymer salt for comparison (1) | 180 |
| 46 | maleic acid polymer salt for comparison (2) | 177 |
| 47 | maleic acid polymer salt for comparison (3) | 110 |
| 48 | maleic acid copolymer salt for comparison (4) | 186 |
| 49 | maleic acid copolymer salt for comparison (5) | 170 |
| 50 | maleic acid copolymer salt for comparison (6) | 105 |
| 51 | maleic acid copolymer salt for comparison (7) | 183 |
| 52 | maleic acid copolymer salt for comparison (8) | 180 |
| 53 | maleic acid copolymer salt for comparison (9) | 118 |
| 54 | maleic acid copolymer salt for comparison (10) | 120 |
| 55 | maleic acid copolymer salt for comparison (11) | 123 |
| 56 | maleic acid copolymer salt for comparison (12) | 165 |
| 57 | maleic acid copolymer salt for comparison (13) | 168 |
| 58 | maleic acid copolymer salt for comparison (14) | 160 |
| 59 | maleic acid copolymer for comparison (15) | 135 |
| 60 | maleic acid copolymer salt for comparison (16) | 164 |
| 61 | maleic acid copolymer salt for comparison (17) | 185 |
| 62 | maleic acid polymer for comparison (18) | 248 |
| 63 | maleic acid polymer salt for comparison (19) | 243 |
| 64 | maleic acid copolymer salt for comparison (20) | 170 |
| 65 | maleic acid copolymer salt for comparison (21) | 155 |
| 66 | maleic acid copolymer salt for comparison (22) | 158 |

As seen in Tables 3~6, it is understood that a superior scale scale inhibitor and a detergent builder led from the maleic acid (co-)polymer salt in the examples are much superior to those led from the maleic acid (co-)polymer (salt) in the examples for comparison.

What is claimed are:

1. A process for producing a maleic acid polymer salt having improved biodegradability which comprises polymerizing a monomer component composed of 75~100 weight % of maleic acid (A) and the remainder another water-soluble ethylenically unsaturated monomer (B) in a medium consisting essentially of an aqueous solution containing 12~150 g of hydrogen peroxide per mole of the monomer component as the polymerization catalyzer; 0.3~500 ppm, based on the weight of the monomer component, of at least one kind of polyvalent metal ion selected from the group consisting of a vanadium containing ion, an iron ion, and a copper ion; and an amount of an alkaline substance added prior to polymerization sufficient to neutralize more than 0 and up to 45 mole % of all the acid in the monomer component to thereby produce a polymer salt comprising neutralized maleic acid having improved biodegradability.

2. A process for producing a polymer as claimed in claim 1, wherein the monomer component is composed of 80~100 weight % of said maleic acid (A) and 20~0 weight % of said water-soluble ethylenically unsaturated monomer (B).

3. A process for producing a polymer as claimed in claim 1, wherein the amount of hydrogen peroxide is 20~70 g per mole of the monomer component.

4. A process for producing a polymer as claimed in claim 2, wherein the amount of hydrogen peroxide is 20~70 g per mole of the monomer component.

5. A process for producing a polymer as claimed in claim 1, wherein the amount of said alkaline substance present during the polymerization is 5~40 mole % based on all the acid in the monomer component.

6. A process for producing a polymer as claimed in claim 2, wherein the amount of said alkaline substance present during the polymerization is 5~40 mole % based on all the acid in the monomer component.

7. A process for producing a polymer as claimed in claim 3, wherein the amount of said alkaline substance present during the polymerization is 5~40 mole % based on all the acid in the monomer component.

8. A process for producing a polymer as claimed in claim 4, wherein the amount of said alkaline substance present during the polymerization is 5~40 mole % based on all the acid in the monomer component.

9. A process for producing a polymer as claimed in any one of claims 1~8, wherein the amount of said polyvalent metal ion is 1~50 ppm based on the weight of the monomer component.

10. A process for producing a polymer as claimed in any one of claim 1~8, wherein the vanadium containing ion is VO$^{2+}$.

11. A process for producing a polymer as claimed in claim 9, wherein the vanadium containing ion is VO$^{2+}$.

12. A process for producing a polymer as claimed in any one of claims 1~8, wherein the iron ion is Fe$^{3+}$.

13. A process for producing a polymer as claimed in claim 9, wherein the iron ion is Fe$^{3+}$.

14. A process for producing a polymer as claimed in any one of claims 1~8, wherein the copper ion is Cu$^{2+}$.

15. A process for producing a polymer as claimed in claim 9, wherein the copper ion is Cu$^{2+}$.

16. A detergent builder composed of a maleic acid polymer salt, improved in biodegradability, which is obtained by polymerizing a monomer component composed of 75~100 weight % of the maleic acid (A) other water-soluble and the remainder being another in an aqueous solution containing 12~150 g per mole of the monomer component of hydrogen peroxide as a polymerization catalyzer; 0.3~500 ppm based on the weight of the monomer component of at least one kind of polyvalent metal ion selected from a vanadium containing ion, an iron ion, and a copper ion; and sufficient alkaline substance added prior to polymerization to neutralize more than 0 and up to 45 mole % of all of the acid in the monomer component.

17. A detergent builder as claimed in claim 16, wherein said water-soluble ethylenically unsaturated monomer (B) is at least one selected from acrylic acid, methacrylic acid, a monomer in the series of unsaturated alcohols represented by the below-described general formula (1), and a monomer in the series of unsaturated allyl ethers represented by the below-described general formula (2):

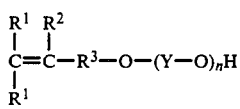

(1)

wherein $R^1$ and $R^2$ independently represent a hydrogen atom or a methyl group and both are not methyl groups at the same time, $R^3$ represents —$CH_2$—, —$(CH_2)_2$—, or —$C(CH_3)_2$— and the total carbon number of $R^1$, $R^2$, and $R^3$ is 3, Y represents an alkylene group of carbon number 2~3, and n is 0 or an integral number of 1~100;

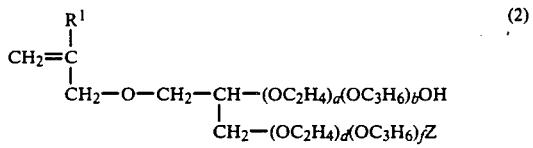

(2)

wherein $R^1$ represents a hydrogen atom or a methyl group, a, b, d and f independently represent 0 or a positive integral number and the sum of a, b, d, and f is 0~100, the units —($OC_2H_4$)— and —($OC_3H_6$)— may be combined in any order, and Z is a hydroxyl, sulfonic acid, or phosphoric acid group when d+f is 0, and Z is a hydroxyl group and d+f is a positive integral number of 1~100.

18. A detergent builder as claimed in claim 17, wherein the monomer component is composed of 75~99.8 weight % of the maleic acid (A) and 25~0.2 weight % of said other water-soluble ethylenically unsaturated monomer (B).

19. A scale inhibitor composed of a maleic acid polymer salt, improved in biodegradability, which is obtained by polymerizing a monomer component composed of 75~100 weight % of the maleic acid (A) and the remainder being another water-soluble ethylenically unsaturated monomer (B) in an aqueous solution containing 12~150 g of hydrogen peroxide per mole of the monomer component as a polymerization catalyzer; 0.3~500 ppm, based on the weight of the monomer component, of at least one kind of polyvalent metal ion selected from a vanadium containing ion, an iron ion, and a copper ion; and sufficient alkaline substance added prior to polymerization to neutralize more than 0 and up to 45 mole % of all of the acid in the monomer component.

20. A scale inhibitor as claimed in claim 19, wherein said water-soluble ethylenically unsaturated monomer (B) is at least one selected from acrylic acid, methacrylic acid, a monomer is a series of unsaturated alcohols represented by the below-described general formula (1), and a monomer in a series of unsaturated allyl ethers represented by the below-described general formula (2):

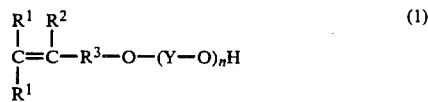

(1)

wherein $R^1$ and $R^2$ independently represent a hydrogen atom or a methyl group and both are not methyl groups at the same time, $R^3$ represents —$CH_2$—, —$(CH_2)_2$—, —$C(CH_3)_2$— and the total carbon number of $R^1$, $R^2$, and $R^3$ is 3, Y represents an alkylene group of carbon number 2~3, and n is 0 or an integral number of 1~100;

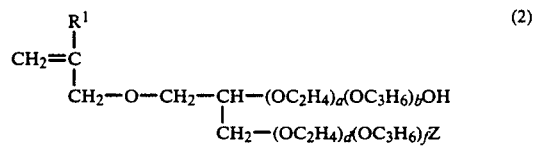

(2)

wherein $R^1$ represents a hydrogen atom or a methyl group, a, b, d, and f independently represent 0 or a positive integral number and the sum of a, b, d, and f is 0~100, the units —($OC_2H_4$)— and —($OC_3H_6$)— may be combined in any order, and Z is a hydroxyl, sulfonic acid, or phosphoric acid group when d+f is 0, and Z is a hydroxyl group when d+f is a positive integral number of 1~100.

21. A scale inhibitor as claimed in claim 20, wherein the monomer component is composed of 75~99.8 weight % of the maleic acid (A) and 25~0.2 weight % of said water-soluble ethylenically unsaturated monomer (B).

* * * * *